(12) United States Patent
Dzvonik

(10) Patent No.: US 6,609,724 B1
(45) Date of Patent: Aug. 26, 2003

(54) HUMAN-POWERED CYCLE WHICH IS RIDDEN WHILE LYING DOWN

(76) Inventor: Emil Dzvonik, 07231, Vinne 452 (SK)

(*) Notice: Subject to any disclaimer, the term of this patent is extended or adjusted under 35 U.S.C. 154(b) by 0 days.

(21) Appl. No.: 10/019,798
(22) PCT Filed: Jul. 6, 2000
(86) PCT No.: PCT/IB00/00914
§ 371 (c)(1),
(2), (4) Date: Jan. 4, 2002
(87) PCT Pub. No.: WO01/03996
PCT Pub. Date: Jan. 18, 2001

(30) Foreign Application Priority Data

Jul. 7, 1999 (DE) .......................................... 199 31 197

(51) Int. Cl.⁷ .............................. B62M 1/04; B62K 3/04
(52) U.S. Cl. .................... 280/288.1; 280/220; 280/251; 280/252
(58) Field of Search ................................ 280/220, 221, 280/236, 237, 251, 252, 270, 279, 281.1, 288.1

(56) References Cited

U.S. PATENT DOCUMENTS

| | | | | |
|---|---|---|---|---|
| 4,592,563 A | * | 6/1986 | Dean et al. | 280/253 |
| 4,700,962 A | * | 10/1987 | Salmon | 280/220 |
| 4,796,907 A | * | 1/1989 | Geller | 280/220 |
| 4,838,568 A | * | 6/1989 | Arroyo | 280/234 |
| 4,878,684 A | * | 11/1989 | Lemle | 280/288.1 |
| D357,889 S | * | 5/1995 | Jones | D12/111 |
| 5,833,256 A | * | 11/1998 | Gilmore | 280/224 |
| 5,979,922 A | * | 11/1999 | Becker et al. | 280/252 |
| 6,000,707 A | * | 12/1999 | Miller | 280/288.1 |
| 6,155,584 A | * | 12/2000 | Dallet | 280/252 |

FOREIGN PATENT DOCUMENTS

| | | |
|---|---|---|
| DE | 35 16 322 | 10/1986 |
| DE | 91 03 403 | 9/1991 |
| DE | 296 22 231 | 3/1997 |
| EP | 706 934 | 4/1996 |
| JP | 09095282 | 4/1997 |

* cited by examiner

Primary Examiner—Avraham Lerner
(74) Attorney, Agent, or Firm—Pauley Petersen Kinne & Erickson

(57) ABSTRACT

A cycle having front wheel forks with a front wheel, a steering device connected to the front wheel forks, and rear stays with a rear wheel that has a free-wheeling hub. The cycle of this invention also includes a frame which connects the forks and the stays, a seat that can be fastened to the frame, a rear wheel drive, and foot actuating means for the rear wheel drive. The frame is formed by an individual essentially horizontal rail. The foot actuating devices are displaceably guided in the longitudinal direction of the rail. The foot actuating devices are formed by a foot rest for both feet. The seat can be displaced on the rail in a longitudinal direction of the rail, and the steering device is formed by handlebars between which the rail extends. The handlebars are provided with hand grips.

20 Claims, 5 Drawing Sheets

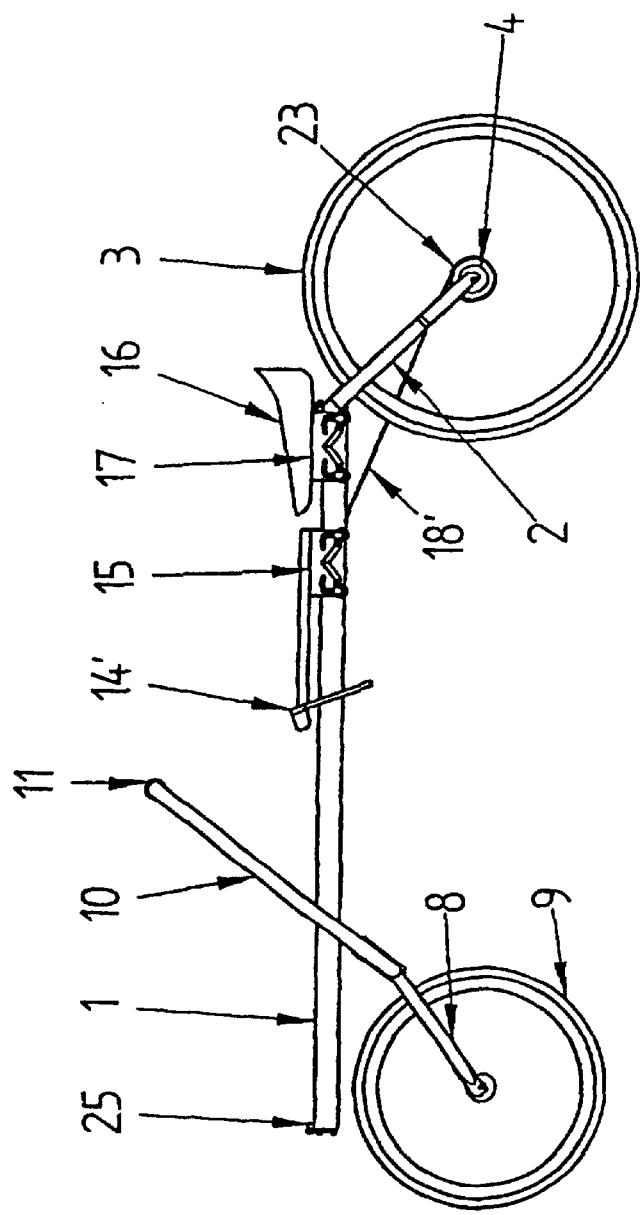
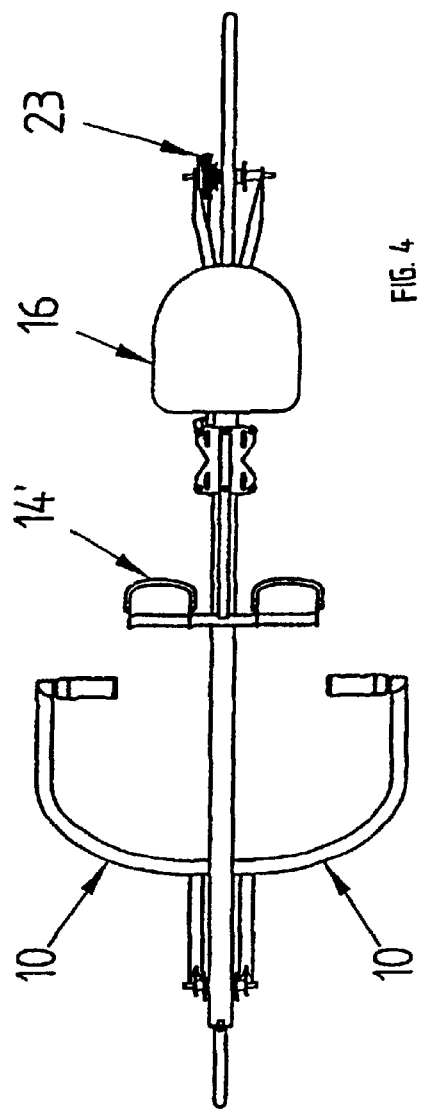
FIG. 3
FIG. 4

HUMAN-POWERED CYCLE WHICH IS RIDDEN WHILE LYING DOWN

BACKGROUND OF THE INVENTION

1. Field of the Invention

The invention relates to a cycle having a front-wheel fork, a steering device connected to the front wheel fork, and a rear-wheel fork with a rear wheel that has a freewheeling hub.

2. Description of Related Art

Such a cycle is known from French Patent Reference FR-A1-2 728 532. The chassis is formed by a substantially horizontal square tube, on each side of which is a footrest for each foot in a longitudinally displaceable manner. Each footrest is connected by a cable to an associated cable pulley, connected to a sprocket wheel, of the drive, which also includes the freewheeling hub and a chain, which drives the hub, and a chain which travels on the sprocket wheel. The footrests are interconnected via an additional cable, which travels over a deflection pulley disposed at the front end of the square tube, and the footrests are alternately actuatable. Furthermore, a handrest with a handle is positioned in a longitudinally displaceable manner on each side of the square tube. The alternately actuatable handrests are connected to the sprocket wheel by additional cables and additional cable pulleys. The front-wheel fork is controlled by the rotatably disposed handles of the handrests via additional cable lines.

A similar cycle is also known from Japanese Patent Reference JP-A-09095282, but this cycle has no manual drive, though it has a steering rod connected to the front-wheel fork. These known cycles have a complex structure because of the many cables and cable pulleys and because of the separate chain drive. Additional cycles are generally known in many different forms. With conventional cycles, the chassis is a mainly triangular frame, on which are positioned the foot actuating means, which are in the form of foot pedals with at least one sprocket wheel which drives the rear wheel via the chain. There is no shortage of experiments to change this foot pedal drive in order to achieve a better sitting position, less wind resistance and/or better utilization of physical strength.

Thus, a muscle-operated driving device is known from German Patent Reference DE-U1-2 9622 231, for a non-steerable road and track vehicle which has a horizontally extending chassis with a front wheel and a driven rear wheel. A seat is securely disposed on the chassis, and a frame, which has footrests, is disposed on the chassis in a longitudinally displaceable manner. A power transmitting member includes a roller chain, and a resilient cable is secured at two different points of the chassis and guided, via a guide roller, which can be pulled by the user, via guide rollers of the chassis, guide rollers of the frame and via the driving wheel, so that a forward propulsion of the vehicle is produced by moving arms and legs. In such case, a seat is positioned on the chassis. The disadvantages of this design are that it has a complex structure and is hardly suitable as a cycle. A muscle-operated vehicle, in the form of a cycle, is known from European Patent Reference EP-A1-0 706 934, which includes a chassis which has footrests for both feet disposed at the front end thereof, and on which chassis is situated a seat which is displaceably mounted in the longitudinal direction.

The two ends of a driving traction means are secured on the seat, and the means is guided via counterrotating guide rollers of the seat, via guide rollers of the chassis and via a driving wheel of the rear wheel. A forward propulsion of the cycle can be produced by moving the seat on the chassis backwardly and forwardly. The disadvantages of such a cycle are that, when the cycle is driven, it is not possible for the user to rest its body, because the cycle is thereby made difficult to steer, and in the fact that a plurality of direction reversing locations for the driving traction means are used, and the means still has to be returned by resilient force. A three-wheeled vehicle is known from German Patent Reference DE-A1-3 516 322 and has a chassis in the form of a horizontally extending frame, a sliding seat and a tractive machine traveling on the longitudinal frame struts, which machine is securely connected to a driving traction means, and by means of which machine the steering of the front wheel is also possible. Fixed footrests are provided on the left and right sides of the frame. The driving traction means travels over a guide roller, which is disposed on the front portion of the frame, and via the driving wheel for the rear wheels. The three-wheel driving mechanism is not suitable for two-wheeled cycles. Also, the body of the user cannot adopt a resting position during the driving operation. Finally, a muscle-operated three-wheeled vehicle is known from German Patent Reference DE-U1-9 103 403, having a front axle, which has two front wheels and is horizontally pivotable, with footrests mounted on the axle for steering purposes. The vehicle has a chassis which has a frame member extending horizontally between the front wheels and rear wheel. A sliding seat travels along this frame member. A traction drum is mounted at the front end of the chassis and has a freewheeling hub, a return spring and a tension cable. Furthermore, the traction drum is connected to the rear-wheel drive by a chain via guide hubs. By pulling on the tension cable and/or stretching the legs with the aid of the sliding seat, a forward propulsion of the cycle can be achieved.

The unsafe position of the user on the seat is, however, disadvantageous. The arms of the user are not securely retained, and the support for the feet is very problematical because of the rotatability of the front axle.

SUMMARY OF THE INVENTION

One object of this invention is to provide a cycle of the type mentioned above but which has a simple structure and a simple, effective driving apparatus.

This object is achieved with features of this invention as described in the claims.

The forward propulsion of the cycle can be produced initially, by stretching the legs of the user, and the footrest is advanced. The cycle can best be steered during this driving phase because the body of the user adopts a restful position. During a second driving phase, the footrest is advanced further by the arms pulling on the steering means when the legs are stretched and the seat is pushed forwardly. During these two driving phases, a driving means drives the rear wheel. The driving means is easily returned by stretching the arms and bending the legs, whereby the footrest is pressed downwardly because of the weight of the legs, and the freewheeling hub of the rear wheel is operated in the freewheeling mode.

Further advantageous embodiments of this invention are described in the claims.

According to an additional embodiment of this invention, the bar has an angular or non-circular cross-section. For this reason, the non-rotatability of the footrest and seat on the bar is ensured in a simple manner.

According to an advantageous, further embodiment of this invention, the footrest and seat each have a slide which slides along the bar.

According to a further embodiment of this invention, the length of the bar corresponds to at least the sum of the leg length and the arm length of the user. Thus, the intended function of the drive is totally fulfilled.

According to an advantageous, further embodiment of this invention, the front-wheel fork, complete with front wheel, is disposed beneath the bar and secured on the bar by means of a fork holder.

According to an embodiment of this invention, the fork holder, complete with fork, extends inclinedly forwardly. Thus, the suspension of the front wheel is improved.

In an additional, advantageous embodiment of this invention, the portions of the steering fork extend substantially parallel to the front-wheel fork and to the fork holder, and are each bent outwardly and carry the handles at free ends.

According to an additional, advantageous embodiment of this invention, a driving loop, which contains the chain, is securable on the footrest, the loop extending longitudinally of the bar is guided by means of at least one guide wheel, which is attached to the front end of the bar, and with at least one guide wheel which is attached in the vicinity of the rear end of the bar.

According to an additional embodiment of this invention, the driving loop is guided via a guide roller secured on the fork holder. Thus, it is possible to avoid any possible contact between the driving loop and the front wheel.

According to an additional embodiment of this invention, a driving cable is securable on the footrest, the other end of which cable is windable onto a cable drum, which is connected to the freewheeling hub and is initially tensioned with a return spring. Thus, a chain and guide rollers are no longer necessary.

According to an advantageous, additional embodiment of this invention, the rear-wheel fork, secured at the rear end of the bar, extends inclinedly rearwardly. Thus, the suspension of the rear wheel is improved.

BRIEF DESCRIPTION OF THE DRAWINGS

This invention is explained more fully with reference to one embodiment, wherein:

FIG. 3 is a schematic side elevational view of a second embodiment of a cycle;

FIG. 4 is a plan view of the cycle of FIG. 3;

DESCRIPTION OF PREFERRED EMBODIMENTS

Figure 1:
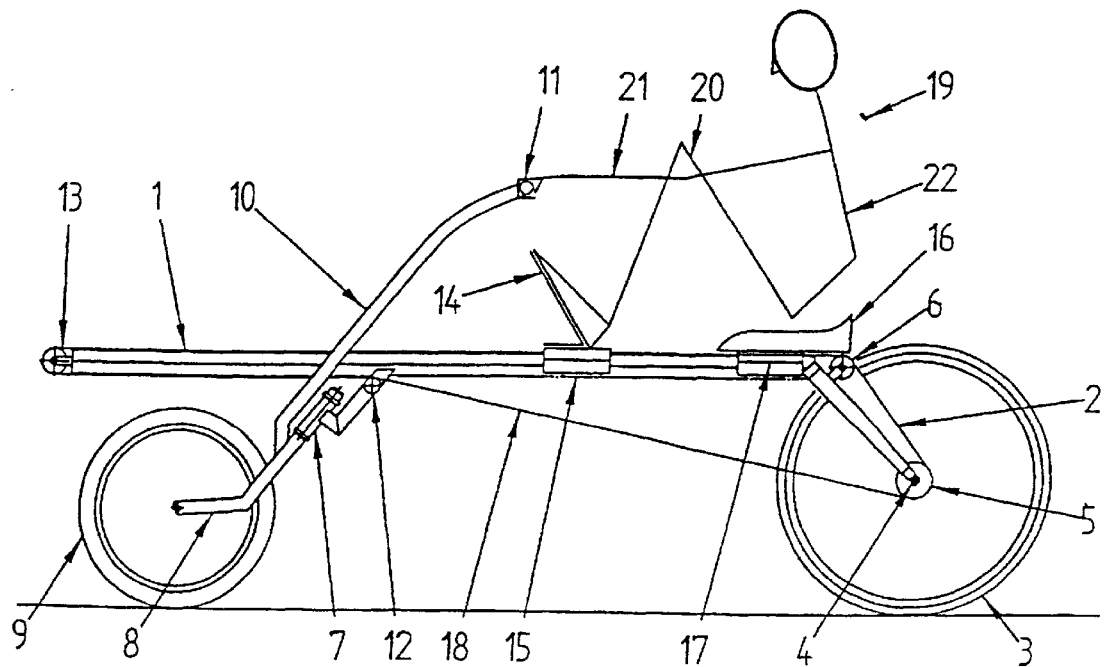
FIG. 1 is a schematic side elevational view of a first embodiment of a cycle showing a user in the initial driving position.

FIG. 1 illustrates a cycle which includes, as the chassis, a bar 1 which extends substantially horizontally and has an angular cross-section. A rear-wheel fork 2 is secured at a rear end of the bar and extends inclinedly rearwardly and downwardly. A rear wheel 3 is retained in the rear-wheel fork and has, in known manner, a freewheeling hub 4 and a driving wheel 5. A guide roller 6 is secured at the upper end of the rear-wheel fork 2.

A fork holder 7 is secured in a central region of the bar 1 beneath the bar, and a front-wheel fork 8 is rotatably mounted in the holder. The fork holder 7 and the front-wheel fork 8 extend inclinedly forwardly and downwardly. The front-wheel fork 8 carries a front wheel 9, which is also disposed beneath the bar 1. Furthermore, a steering fork 10 is attached to the front-wheel fork 8, which steering fork, as is not apparent from FIG. 1, comprises two portions which extend substantially parallel to the front-wheel fork 8 and to the fork holder 7, the portions each being bent outwardly and carrying handles 11 at their free ends. A guide roller 12 is attached to the upper end of the fork holder 7.

An additional guide roller 13 is attached to the front end of the bar 1. A footrest slide 15, which carries a footrest 14 for both feet, and a seat slide 17, which carries a seat 16, are disposed in a longitudinally displaceable and non-rotatable manner on the bar 1.

A driving loop 18 is secured on the footrest slide 15 and extends from there back to the footrest slide 15 via the guide roller 13, the guide roller 12, the driving wheel 5, the guide roller 6 and beneath the seat 16. The driving loop 18 comprises a cable and a chain, which is positioned in the region of the driving wheel 5.

Figure 2:
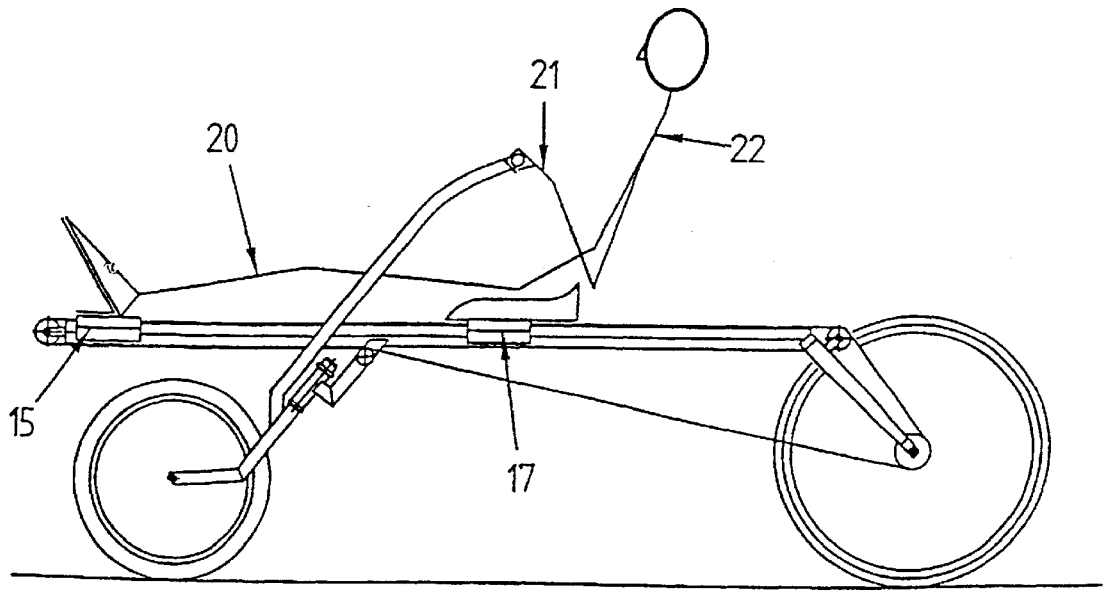
FIG. 2 is a schematic view that illustrates the cycle of FIG. 1 showing the user in the end driving position.
Figure 5:
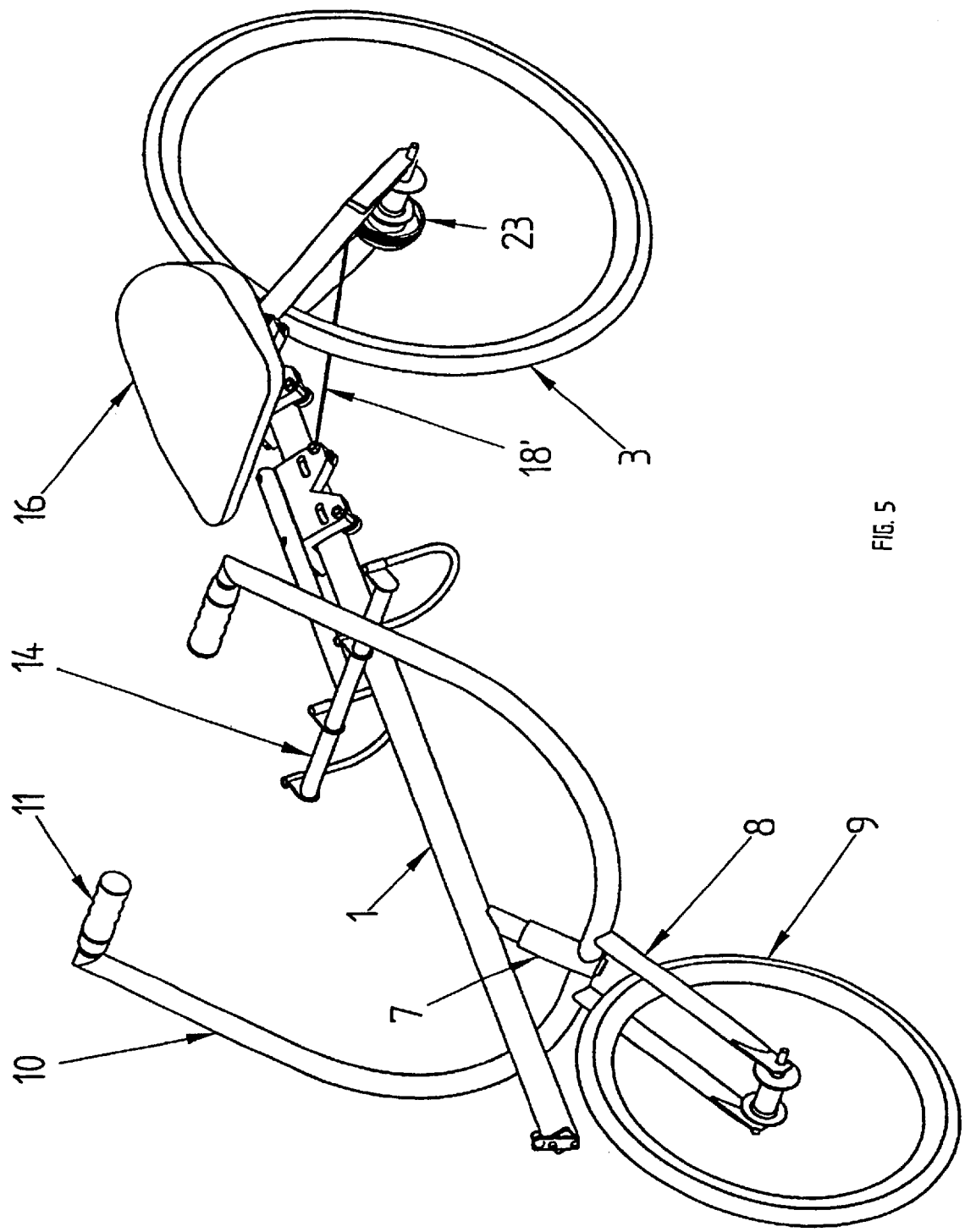
FIG. 5 is a perspective view of the cycle illustrated in FIGS. 3 and 4, showing the pushed-forward end position of the footrest and of the seat.
Figure 6:
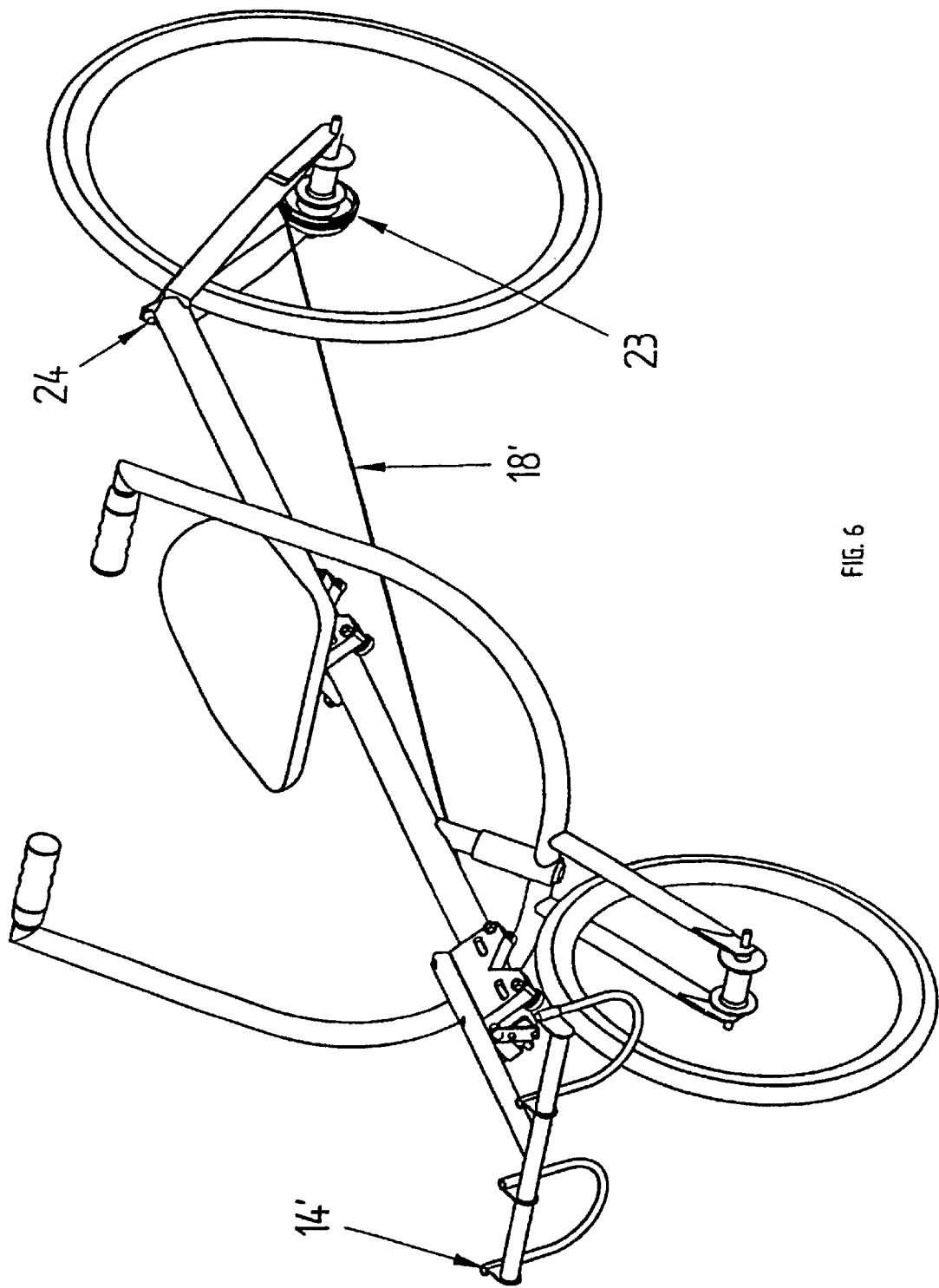
FIG. 6 is a perspective view of the cycle illustrated in FIGS. 3 and 4, showing the pushed-back end position of the footrest as well of the seat.
Figure 7:
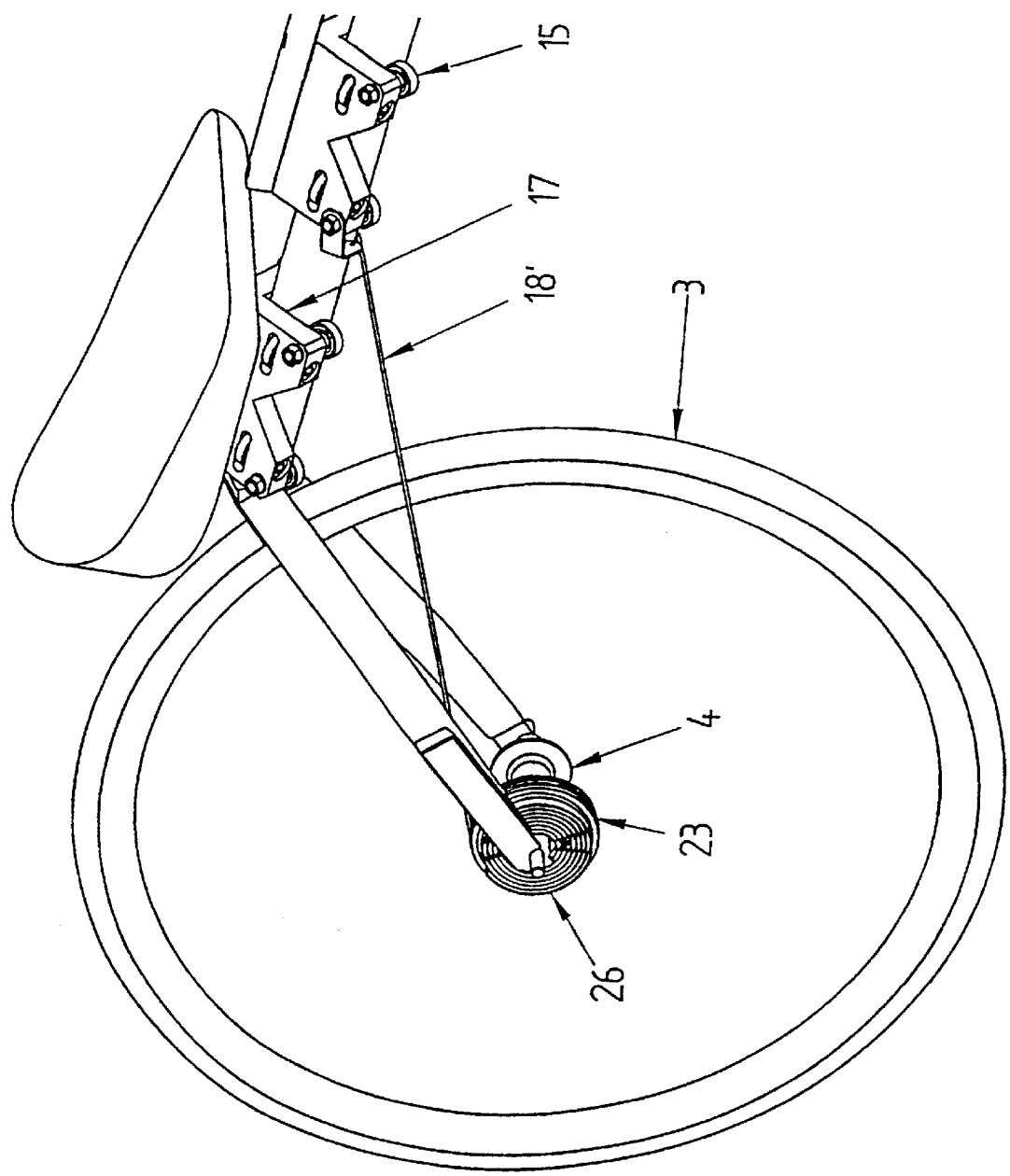
FIG. 7 is a perspective view of a rear part of the cycle of FIGS. 3–6.

A user 19, who supports its feet on the footrest 14 with its legs 20 bent and grips the handles 11 with its hands with outstretched arms 21, sits on the seat 16. In a first driving phase, the legs 20 are stretched, whereby the footrest slide 15 is advanced, and the driving loop drives the rear wheel 3. In this driving phase, a steering of the cycle is also possible in optimum manner. In a second driving phase, the arms 21 are bent while the legs 20 are stretched, whereby the footrest slide 15 is advanced further into an end position, and the seat slide 17 also reaches an end position. These end positions are apparent from FIG. 2. It is also apparent that the length of the bar 1 should preferably correspond to at least the sum of the length of the legs 20 and the length of the arms 21 for an optimum utilization of the physical strength of the user 19. The cycle also remains steerable during this second driving phase. The driving loop 18 is returned again by stretching the arms 21 and bending the legs 20, whereby the weight of the legs 20 presses on the footrest 14 and the footrest slide 15, and the freewheeling hub 4 is operated in the freewheeling mode. The initial position, illustrated in FIG. 1, is then reached again.

The second embodiment of the cycle according to this invention, illustrated in FIGS. 3–7 has a structure similar to that of the above-described cycle. Identical or identically operational parts, such as in FIGS. 1 and 2, have the same reference numerals. The only differences are the lack of guide rollers and an alternative cable drive.

The footrest slide 15 and the seat slide 17 are again disposed on the bar 1 so as to be displaceable backwardly and forwardly. The footrest slide 15 is connected to the footrest 14', which has a somewhat different configuration. A cable 18' is also connected to the footrest slide 15, the other end of said cable being wound onto a cable drum 23. The cable drum 23 is connected to the freewheeling hub 4 and has an initially tensioned return spring 26, which tensions the cable 18' in each position of the footrest slide 15. Furthermore, rubber stop members 24 and 25 are provided at the ends of the bar 1 and define the travel movement of the slides 15 and 17. Thus a chain and a closed driving loop are no longer used.

What is claimed is:

1. In a cycle having a front-wheel fork (8) with a front wheel (9), a steering device connected to the front-wheel fork (8), a rear-wheel fork (2) with a rear wheel (3) having a freewheeling hub (4), a chassis (1) connecting the forks (8, 2), a seat (16) securable on the chassis (1), a rear-wheel drive mechanism (5, 18), and foot actuating means (14, 15) for the rear-wheel drive mechanism (5, 18), the chassis (1) formed by a single substantially horizontal bar (1), and the foot actuating means (14, 15) guided in a longitudinally displaceable manner when viewed with respect to a longitudinal direction of the bar (1), the improvement comprising:

the foot actuating means (14, 15) formed by a footrest (14, 14') for both feet of a user (19);

the seat (16) guided on the bar (1) in a longitudinally displaceable manner when viewed with respect to the longitudinal direction of the bar; and the steering device formed by a steering fork (10) having handles (11), and the bar (1) extending between the steering fork (10).

2. In the cycle according to claim 1, wherein the bar (1) has an angular cross-section.

3. In the cycle according to claim 2, wherein the footrest (14) and the seat (16) each have a slide (15, 17) which slides along the bar (1).

4. In the cycle according to claim 3, wherein a length of the bar (1) corresponds to at least a sum of lengths of a leg (20) and an arm (21) of the user (19).

5. In the cycle according to claim 4, wherein the front-wheel fork (8) and the front wheel (9) are positioned beneath the bar (1) and secured on the bar (1) by a fork holder (7).

6. In the cycle according to claim 5, wherein the fork holder (7) and the fork (8) extend inclinedly forwardly.

7. In the cycle according to claim 6, wherein portions of the steering fork (10) extend substantially parallel to the front-wheel fork (8) and to the fork holder (7), and each is bent outwardly and carries one of the handles (11) at each of free ends.

8. In the cycle according to claim 7, wherein a driving loop (18) which contains a chain is securable on the footrest (14), the driving loop extends longitudinally of the bar (1) and is guided by at least one guide wheel (13) attached to a front end of the bar (1), and is guided by at least one guide wheel (6) attached near a rear end of the bar (1).

9. In the cycle according to claim 8, wherein the driving loop (18) is guided by a guide roller (12) attached on the fork holder (7).

10. In the cycle according to claim 7, wherein a driving cable (18') is securable on the footrest (14') and an other end of the driving cable (18') is windable onto a cable drum (23) which is connected to the freewheeling hub (4) and is initially tensioned by a return spring (26).

11. In the cycle according to claim 10, wherein the rear-wheel fork (2) secured at the rear end of the bar (1) extends inclinedly rearwardly.

12. In the cycle according to claim 1, wherein the footrest (14) and the seat (16) each have a slide (15, 17) which slides along the bar (1).

13. In the cycle according to claim 1, wherein a length of the bar (1) corresponds to at least a sum of lengths of a leg (20) and an arm (21) of the user (19).

14. In the cycle according to claim 1, wherein the front-wheel fork (8) and the front wheel (9) are positioned beneath the bar (1) and secured on the bar (1) by a fork holder (7).

15. In the cycle according to claim 14, wherein the fork holder (7) and the fork (8) extend inclinedly forwardly.

16. In the cycle according to claim 5, wherein portions of the steering fork (10) extend substantially parallel to the front-wheel fork (8) and to the fork holder (7), and each is bent outwardly and carries one of the handles (11) at each of free ends.

17. In the cycle according to claim 1, wherein a driving loop (18) which contains a chain is securable on the footrest (14), the driving loop extends longitudinally of the bar (1) and is guided by at least one guide wheel (13) attached to a front end of the bar (1), and is guided by at least one guide wheel (6) attached near a rear end of the bar (1).

18. In the cycle according to claim 17, wherein the driving loop (18) is guided by a guide roller (12) attached on the fork holder (7).

19. In the cycle according to claim 1, wherein a driving cable (18') is securable on the footrest (14') and an other end of the driving cable (18') is windable onto a cable drum (23) which is connected to the freewheeling hub (4) and is initially tensioned by a return spring (26).

20. In the cycle according to claim 1, wherein the rear-wheel fork (2) secured at the rear end of the bar (1) extends inclinedly rearwardly.

* * * * *